United States Patent
Saitou et al.

(10) Patent No.: US 6,869,673 B2
(45) Date of Patent: Mar. 22, 2005

(54) TRANSPARENT HARD COAT FILM

(75) Inventors: Masato Saitou, Saitama (JP);
Masahiro Harada, Tokyo (JP); Masuo Koyama, Ageo (JP); Yoshihisa Kimura, Saitama (JP)

(73) Assignee: Kimoto Co., Ltd. (JP)

(*) Notice: Subject to any disclaimer, the term of this patent is extended or adjusted under 35 U.S.C. 154(b) by 35 days.

(21) Appl. No.: 10/385,640

(22) Filed: Mar. 12, 2003

(65) Prior Publication Data

US 2003/0180520 A1 Sep. 25, 2003

(30) Foreign Application Priority Data

Mar. 15, 2002 (JP) ........................... 2002-071639

(51) Int. Cl.$^7$ ................................. B32B 5/16
(52) U.S. Cl. ................. 428/323; 428/331; 428/336
(58) Field of Search .................. 428/323, 331, 428/336

(56) References Cited

U.S. PATENT DOCUMENTS

| | | | |
|---|---|---|---|
| 5,976,297 A | * | 11/1999 | Oka et al. .................. 156/241 |
| 6,040,044 A | * | 3/2000 | Takahashi et al. .......... 428/323 |
| 6,072,018 A | * | 6/2000 | Wilkes et al. ............... 528/28 |
| 6,103,854 A | * | 8/2000 | Arakawa et al. ........... 528/196 |
| 6,180,188 B1 | * | 1/2001 | Belleville et al. ........... 427/515 |
| 6,271,292 B1 | * | 8/2001 | Mager et al. ............... 524/261 |
| 6,495,253 B1 | * | 12/2002 | Koyama et al. ............ 428/343 |
| 6,572,961 B1 | * | 6/2003 | Koyama et al. ............ 428/323 |
| 6,638,606 B2 | * | 10/2003 | Yoshihara et al. .......... 428/206 |

* cited by examiner

Primary Examiner—H. T. Le
(74) Attorney, Agent, or Firm—Lorusso, Loud & Kelly

(57) ABSTRACT

In a transparent hard coat film, in which a transparent hard coat layer is formed on at least one surface of a transparent polymer film, the transparent hard coat layer is composed of at least an ionizing radiation curable organic-inorganic hybrid hard-coat agent and inorganic particles having a mean particle diameter of 1–10 $\mu$m. The organic-inorganic hybrid hard-coat agent preferably contains reactive silica. Such a transparent hard coat film of the present invention has well-balanced anti-glare effect and resolution and yet has hardness that is typically expressed as surface hardness.

4 Claims, No Drawings

TRANSPARENT HARD COAT FILM

BACKGROUND OF THE INVENTION

The present invention relates to a transparent hard coat film. In particular, it relates to transparent hard coat film suitable for a surface member in various types of display devices such as liquid crystal display devices, CRT displays, plasma displays, and EL displays.

RELATED ART

Conventionally, transparent hard coat films consisting of a transparent polymer film having a roughened surface have been used on a screen of liquid displays or plasma displays in order to both protect the surface and to prevent poor visibility due to glare caused by exterior light reflected from the screen. To provide the transparent polymer film with a roughened surface, provision of a transparent hard coating including a particulate matting agent is generally employed (Japanese Patent Application Publication Nos. S61-209154, S64-51932, for example).

In such transparent hard coat films subjected to conventional surface roughening, however, it has been difficult to satisfy the requirements for anti-glare effect, good resolution and hardness in good balance. For example, in the case of the aforementioned transparent hard coat layer including particles as a matting agent, the high content of the particles causes increase of haze and thereby reduces resolution, whereas a low content of the particles causes an increase in gloss, increase in glare and reduces visibility of displayed images. Use of particles having a small diameter is effective for reducing haze and improving resolution but the uneven surface is not easily produced the and anti-glare effect is reduced unless the hard coat layer is made thin. If the thickness of the hard coat layer is thin, a problem of reduction in surface hardness is the result. While making the hard coat layer thicker is effective to impart hardness, which is typically expressed as surface hardness, particles become embedded in the layer, an uneven surface is not easily formed and the anti-glare effect is reduced.

Accordingly, there has been a strong demand for a transparent hard coat film, by which the aforementioned problems are solved, having well-balanced optical properties of anti-glare and resolution, and hardness.

Therefore, an object of the present invention is to provide a transparent hard coat film having well-balanced optical properties of anti-glare effect, resolution, and hardness.

DISCLOSURE OF THE INVENTION

Accordingly, the present invention provides a transparent hard coat layer formed on at least one surface of a transparent polymer film, wherein the transparent hard coat layer includes at feast an ionizing radiation curable organic-inorganic hybrid hard-coat agent and a matting agent including inorganic particles having a mean particle diameter of 1–10 $\mu$m.

The organic-inorganic hybrid hard-coat agent is a material in which inorganic microparticles are highly and uniformly dispersed in an organic binder when it is made into a film, and which exhibits properties that cannot be obtained in films consisting of only an organic binder.

The ionizing radiation curable organic-inorganic hybrid hard-coat agent may be in the form of reactive silica particles having photosensitive, photopolymerizable groups are introduced at least on the surface and a mean particle diameter of 0.001–0.1 $\mu$m.

A transparent hard coat film of the present invention preferably has a transparent hard coat layer with a thickness of 2–10 $\mu$m.

The inorganic particles serving as a matting agent are contained in an amount of not less than 2 parts by weight and not more than 20 parts by weight based on 100 parts by weight of the hard-coat agent.

Since the present invention uses the organic-inorganic hybrid hard-coat agent and inorganic particles of a particular particle diameter in combination for a hard coat layer, the anti-glare effect can be improved without increase in haze or loss of resolution, and high hardness can be attained.

DESCRIPTION OF THE PREFERRED EMBODIMENTS

The transparent hard coat film of the present invention has a transparent hard coat layer formed on at least one surface of a transparent polymer film.

The transparent polymer film may be formed of any material which does not impair transparency, including polyethylene terephthalate, polybutylene terephthalate, polyethylene naphthalate, polycarbonates, polyethylenes, polypropylenes, polystyrenes, triacetyl cellulose, acrylics, and polyvinyl chloride. A polyethylene terephthalate film subjected to orientation, in particular biaxial orientation, is preferred in view of superiority in mechanical strength and dimensional stability. It is also preferred to use a film having a surface subjected to corona discharge treatment or provided with an adhesive layer to improve adhesion to the transparent hard coat layer.

The thickness of such a transparent polymer film is suitably selected depending on the material, but is generally 25–500 $\mu$m, preferably 50–200 $\mu$m.

The transparent hard coat layer that is formed on at least one surface of the transparent polymer film consists of at least an ionizing radiation curable organic-inorganic hybrid hard-coat agent (referred to as "HbHC agent" hereinafter) and inorganic particles as a matting agent.

The HbHC agent is a material that is cured by ionizing radiation and, when made into a film, inorganic microparticles are uniformly dispersed in an organic binder. In an uncured state the organic binder may be chemically bonded with the inorganic microparticles or inorganic microparticles may be uniformly dispersed in an ionizing radiation curable organic binder.

As the inorganic microparticles, silica, particularly reactive silica particles having photosensitive, photopolymerizable groups at least on its surfaces (sometimes referred as "reactive silica particles") is preferred. Suitable photopolymerizable, photosensitive groups include (meth) acryloyl oxy groups. When such an HbHC agent containing reactive silica particles is used, the HbHC agent may further include compounds that can be photopolymerized with the photopolymerizable photosensitive groups on the surfaces of the reactive silica particles, such as organic compounds having polymerizable unsaturated groups.

The reactive silica particles are powder-like or colloidal and are chemically bonded through silyl oxy groups to a compound having a hydrolyzable silyl group (A), a polymerizable unsaturated group (B), a group (C) represented by the following formula (1) or a group (D) represented by the following formula (2) (referred as a "polymerizable unsaturated group modified hydrolyzable silane" hereinafter). That is, the hydrolyzable silyl group of the polymerizable unsaturated group modified hydrolyzable silane is hydrolyzed to form a silyl oxy group, which forms chemical bonds between the silica particles.

In formula (1), X is selected from NH, oxygen and sulfur, and Y is selected from oxygen and sulfur. However, if X is oxygen then Y is sulfur.

Examples of the hydrolyzable silyl groups (A) include carboxylate silyl groups such as alkoxy silyl and acetoxy silyl, halogenated silyl groups such as chlorosilyl, amino silyl, oxime silyl, hydride silyl and the like.

Examples of the polymerizable unsaturated groups (B) include acryloyl oxy, methacryoyl oxy, vinyl, propenyl, butadienyl, styryl, ethynyl, cinnamoyl, malate, and acrylic amide.

The reactive silica particles used in the present invention have a mean particle diameter of preferably 0.001–0.1 µm, more preferably 0.001–0.01 µm. Use of the reactive silica particles having such a range of mean particle diameter, in combination with a matting agent comprising inorganic particles having a mean particle diameter of 1–10 µm, which will be explained later, can provide well-balanced optical properties of anti-glare effect and resolution, and sufficient hardness for a transparent hard coat layer.

An unsaturated organic compound having polymerizable unsaturated groups, may be included in the HbHC agent as another component. Such a compound may be a polyvalent unsaturated organic compound having two or more of polymerizable unsaturated groups in one molecule or a monovalent unsaturated organic compound having one polymerizable group in one molecule.

Examples of the polyvalent unsaturated organic compound include ethylene glycol di(meth)acrylate, diethylene glycol di(meth)acrylate, glycerol di(meth)acrylate, glycerol tri(meth)acrylate, 1,4-buthane diol di(meth)acrylate, 1,6-hexane diol di(meth)acrylate, neopentyl glycol di(meth) acrylate, trimethylol propane tri(meth)acrylate, dicyclo pentan di(meth)acrylate, pentaerythritol tri(meth)acrylate, pentaerythritol tetra(meth)acrylate, dipentaerythritol hexa (meth)acrylate, dipentaerythritol monohydroxy penta(meth) acrylate, ditrimethylol propane tetra(meth)acrylate, diethylene glycol di(meth)acrylate, polyethylene glycol di(meth) acrylate, tripropylene glycol di(meth)acrylate, and polypropylene glycol di(meth)acrylate.

Examples of the monovalent unsaturated organic compounds include methyl(meth)acrylate, ethyl(meth)acrylate, propyl(meth)acrylate, butyl(meth)acrylate, 2-ethylhexyl (meth)acrylate, isodesyl(meth)acrylate, lauryl(meth) acrylate, stearyl(meth)acrylate, allyl(meth)acrylate, cyclohexyl(meth)acrylate, methyl cyclohexyl(meth) acrylate, isobornyl(meth)acrylate, 2-hydroxyethyl(meth) acrylate, 2-hydroxy propyl(meth)acrylate, glycerol (meth) acrylate, glycidyl(meth)acrylate, benzyl (meth)acrylate, 2-ethoxy ethyl(meth)acrylate, 2-(2-ethoxyethoxy)ethyl (meth)acrylate, butoxy ethyl(meth)acrylate, 2-methoxyethyl (meth)acrylate, methoxy diethyleneglycol(meth)acrylate, methoxy triethyleneglycol(meth)acrylate, methoxy polyethyleneglycol(meth)acrylate, 2-methoxy propyl(meth) acrylate, methoxy dipropyleneglycol(meth)acrylate, methoxy tripropyleneglycol(meth)acrylate, methoxy polypropyleneglycol(meth)acrylate, polyethylene glycol (meth)acrylate, and polypropylene glycol(meth)acrylate.

The HbHC agent may be prepared by adding a diluting solvent to the aforementioned reactive silica particles and unsaturated organic compound having polymerizable unsaturated groups to regulate the solid content.

The inorganic particles which may be used as a matting agent include silica, alumina, talc, clay, calcium carbonate, magnesium carbonate, barium sulfate, aluminium hydroxide, titanium dioxide, and zirconium oxide. Two or more may be used in combination. Among them, silica, particularly porous silica is preferably used.

The inorganic particles preferably have a mean particle diameter of 1–10 µm. According to the inventor's study, when the inorganic particles of a mean particle diameter in this range are used as a matting agent in combination with the aforementioned HbHC agent, the effect of the present invention, that is, a transparent hard coat layer having well-balanced anti-glare effect and resolution, and hardness can be obtained. From the viewpoint of further improving these properties, inorganic particles having a mean particle diameter of 2–8 µm are preferably used.

The content of the inorganic particles is not less than 2 parts by weight, preferably not less than 4 parts by weight, more preferably 6 parts by weight, and not more than 20 parts by weight, preferably not more than 18 parts by weight, more preferably not more than 16 parts by weight, based on 100 parts by weight of the solid content of the HbHC agent. As previously mentioned, anti-glare and resolution of the transparent hard coat film depend on not only the content of the matting agent but also the thickness of the layer. In the preferred range of thickness of the hard coating layer, a content of not less than 2 parts by weight can provide sufficient anti-glare and a content of not more than 20 parts by weight can provide high resolution.

The transparent hard coat layer of the present invention may occasionally include components other than the HbHC agent and inorganic particles such as thermoplastic resins, thermosetting resins, ionizing radiation curable resins, and photopolymerization initiator.

Examples of the thermoplastic resins include cellulose derivatives such as acetyl cellulose, nitro cellulose, acetyl butyl cellulose, ethyl cellulose and methyl cellulose, vinyl resins such as vinyl acetate and copolymers thereof, vinyl chloride and copolymers thereof and vinylidene chloride and copolymers thereof, acetal resins such as polyvinyl formal and polyvinyl butylal, acrylic resins such as acrylic resin and copolymers thereof and methacrylic resin and copolymers thereof, polystyrene resins, polyamide resins, linear polyester resins, and polycarbonate resins.

Examples of the thermosetting resin include thermosetting urethane resins composed of acrylic polyol and isocyanate prepolymer, phenol resins, urea melamine resins, epoxy resins, unsaturated polyester resins, and silicone resins.

The ionizing radiation curable resin is an ionizing radiation curable paint, which contains one or more types of photopolymerizable prepolymers or photopolymerizable monomers and which can be cured by ionizing radiation (ultraviolet beam or electron beam). Among the photopolymerizable prepolymers, acrylic prepolymers, which have two or more acryloyl groups in one molecule and produce a three dimensional network structure by curing with crosslinking, are particularly preferably used. Examples of the acrylic prepolymers include urethane acrylate, polyester acrylate, epoxy acrylate, melamine acrylate. As the photopolymerizable monomers, the aforementioned polyvalent unsaturated organic compounds can be used.

Further, the photopolymerization initiator can be acetophenone, benzophenone, Michler's ketone, benzoin, benzyl methyl ketal, benzoin benzoate, hydroxy cyclohexylphenyl ketone, 2-methyl-1-(4-(methylthio)phenyl)-2-(4-morpholinyl)-1-propane, α-acyloxime ester, thioxanthone and the like.

The thickness of the transparent hard coat layer of the present invention is 2–10 μm, preferably 3–8 μm. With a thickness of not less than 2 μm, a sufficient hardness for the transparent hard coat film can be obtained. With a thickness of not more than 10 μm, balance of optical properties can be easily regulated and the transparent polymer film provided with transparent hard coat layer on one surface is kept from curling.

The transparent hard coat layer mentioned above can be formed by mixing the HbHC agent, inorganic particles and occasionally the other components to prepare a paint which contains a diluting solvent as needed, applying the paint onto the surface of the transparent polymer film using a conventional coating method and curing the paint by irradiation with ionizing radiation.

As the ionizing radiation, ultraviolet rays emitted from an extra-high pressure mercury lamp, high pressure mercury lamp, low pressure mercury lamp, carbon arc, metal halide lamp or the like, in a wavelength region of 100–400 nm, preferably 200–400 nm, or electron beams emitted from a scanning-type or curtain-type electron beam accelerator in a wavelength region of 100 nm or shorter can be used.

EXAMPLES

Examples of the present invention will be explained hereinafter. In the following examples, "part" and "%" are used on a weight basis unless otherwise indicated.

Example 1

Coating solution (a) for forming the transparent hard coat layer and having the following composition, was applied to one surface of a polyethylene terephthalate film (COSMOSHINE A4300: Toyobo Co., Ltd.) having a thickness of 100 μm, was dried for five minutes at 60° C., and was irradiated with ultraviolet rays from a high pressure mercury lamp for 1–2 seconds to form a transparent hard coat layer having a thickness of about 5 μm. Thus, a transparent hard coat film was produced.

Coating Solution (a) for Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Porous silica particles (Sylysia 446, average particle diameter 4.5 μm, Fuji Silysia Chemical Ltd.) | 5 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

Example 2

Coating solution (b) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 3 μm. Thus, a transparent hard coat film was produced.

Coating Solution (b) for Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Porous silica particles (Sylysia 446, average particle diameter 4.5 μm, Fuji Silysia Chemical Ltd.) | 4 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

Example 3

Coating solution (c) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 7 μm. Thus, a transparent hard coat film was produced.

Coating Solution (c) for Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Porous silica particles (Sylysia 446, average particle diameter 4.5 μm, Fuji Silysia Chemical Ltd.) | 6 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

Comparative Example 1

Coating solution (d) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 5 μm. Thus, a transparent hard coat film was produced.

Coating Solution (d) for Transparent Hard Coat Layer

| | |
|---|---|
| Ionizing radiation curable paint (UniDic 17-806, solids content 80%: Dainippon Ink & Chemicals. Inc.) | 62.5 Parts |
| Porous silica particles (Sylysia 446, average particle diameter 4.5 μm, Fuji Silysia Chemical Ltd.) | 5 Parts |
| Photopolymerization initiator (IRGACURE 651: Ciba Specialty Chemicals K.K.) | 1.5 Parts |
| Methyl ethyl ketone | 62.5 Parts |
| Toluene | 30 Parts |

Comparative Example 2

Coating solution (e) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 10 μm. Thus, a transparent hard coat film was produced.

Coating Solution (e) for Transparent Hard Coat Layer

| | |
|---|---|
| Ionizing radiation curable paint (UniDic 17-806, solids content 80%: Dainippon Ink & Chemicals. Inc.) | 62.5 Parts |
| Porous silica particles (Sylysia 446, average particle diameter 4.5 μm, Fuji Silysia Chemical Ltd.) | 13 Parts |
| Photopolymerization initiator (IRGACURE 651: Ciba Specialty Chemicals K.K.) | 1.5 Parts |
| Methyl ethyl ketone | 62.5 Parts |
| Toluene | 30 Parts |

Comparative Example 3

Coating solution (f) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 2 μm. Thus, a transparent hard coat film was produced.

Coating Solution (f) for Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Fine powder of silica (Aerosil 30, average particle diameter 50 nm, Nippon Aerosil Co., Ltd.) | 4 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

Comparative Example 4

Coating solution (g) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 7 μm. Thus, a transparent hard coat film was produced.

Coating Solution (g) for Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Porous silica particles (Sylysia 446, average particle diameter 14.1 μm, Fuji Silysia Chemical Ltd.) | 5 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

Comparative Example 5

Coating solution (h) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 5 μm. Thus, a transparent hard coat film was produced.

Coating Solution (h) for Forming the Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Acrylic resin particles (MX-500KS, average particle diameter 5 μm, Soken Chemical & Engineering Co., Ltd.) | 5 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

Comparative Example 6

Coating solution (l) for forming the transparent hard coat layer and having the following composition was applied to one surface of a polyethylene terephthalate film (COSMOSHINE A4300: Toyobo Co., Ltd.) having a thickness of 100 μm, dried for five minutes at 60° C., and was irradiated with ultraviolet rays from a high pressure mercury lamp for 1–2 seconds to form a transparent hard coat layer having a thickness of about 5 μm. Thus, a transparent hard coat film was produced.

Coating Solution (l) for Forming the Transparent Hard Coat Layer

| | |
|---|---|
| HbHC agent including at least reactive silica particles having a mean particle diameter of 0.001–0.1 μm and an unsaturated organic compound having a polymerizable unsaturated group (DESOLITE 7501, solids content 50%: JRS Corporation) | 100 Parts |
| Acrylic resin particles (MX-500KS, average particle diameter 5 μm, Soken Chemical & Engineering Co., Ltd.) | 3 Parts |
| Photopolymerization initiator (IRGACURE 651: Ciba Specialty Chemicals K.K.) | 1.5 Parts |
| Methyl ethyl ketone | 40 Parts |
| Toluene | 15 Parts |

The transparent hard coat films thus obtained in the Examples and Comparative Examples were evaluated as follows with regard to anti-glare, resolution, and hardness. The results are shown in Table 1.

Anti-Glare Effect

Using a color computer UGV-5 (Suga Test Instrument Co., Ltd.), glossiness (%) at an incident/emitting angle of 60° was measured. Images displayed on the CRT screen, to which the transparent hard coat film was laminated, were observed and evaluated with regard to reduction of visibility of images caused by reflection of exterior light. In the evaluation, "○" indicates that the result of observation was good and "x" indicates that the result of observation was bad.

Resolution

Using a color computer HGM-2K (Suga Test Instrument Co., Ltd.), haze (%) was measured. Glare of the image displayed on a CRT screen, to which the transparent hard coat film was laminated, was observed and evaluated. In the evaluation, "○" indicates that the result of observation was good and "x" indicates that the result of observation was bad.

Hardness

Using a Taber abrader (Yoshimitu Seiki), an abrasion test was conducted on the surface of the transparent hard coat layer of the transparent hard coat film under conditions of truck wheel: CS-10, load: 500 g, rotation speed: 700 rpm and 500 rotations, and the increase in the amount of haze after the abrasion test was measured and evaluated. In the evaluation, "○" indicates that the increase in the amount of haze was less than 5%, "Δ" indicates that the increase in the amount of haze was not less than 5% and not more than 20%, and "x" indicates that the increase in the amount of haze exceeded 20%.

TABLE 1

| | Resin (parts) | | Particles (parts (diameter)) | | Anti-glare Effect | Reso- lution | |
|---|---|---|---|---|---|---|---|
| | HbHC | UV curable | silica particle | resin particle | (glossiness (%)) | (haze (%)) | Hard- ness |
| Example | | | | | | | |
| 1 | 50 | | 5 (4.5 μm) | | ○ (69.5) | ○ (7.0) | ○ |
| 2 | 50 | | 5 (4.5 μm) | | ○ (69.2) | ○ (7.1) | ○ |
| 3 | 50 | | 6 (4.5 μm) | | ○ (70.5) | ○ (7.0) | ○ |
| Comparative Example | | | | | | | |
| 1 | | 50 | 5 (4.5 μm) | | X (125.4) | ○ (3.1) | X |
| 2 | | 50 | 13 (4.5 μm) | | ○ (70.5) | X (11.7) | X |
| 3 | 50 | | 4 (30 nm) | | X (136.5) | ○ (2.0) | ○ |
| 4 | 50 | | 5 (14.1 μm) | | X (110.0) | ○ (5.2) | ○ |
| 5 | 50 | | | 5 (5 μm) | ○ (40.5) | X (14.0) | Δ |
| 6 | 50 | | | 3 (5 μm) | X (92.1) | ○ (7.0) | Δ |

As will be understood from the results shown in Table 1, the transparent hard coat film of Comparative Example 1, which was prepared using the coating solution (d) containing an ionizing radiation curable paint instead of the HbHC agent of the coating solution (a) of Example 1, exhibited inferior anti-glare whereas it had good resolution. The hardness of the transparent hard coat layer was also inferior.

The transparent hard coat film of Comparative Example 2, which was prepared using an ionizing radiation curable paint other than the HbHC agent, similar to Comparative Example 1, and was admixed with silica particles to the extent that anti-glare became good and resolution became sufficient. Hardness was also unsatisfactory, similar to Comparative Example 1.

The transparent hard coat film of Comparative Example 3, which used inorganic particles having a mean particle diameter of less than 1 μm (30 nm), and the transparent hard coat film of Comparative Example 4, which used inorganic particles having a mean particle diameter of more than 10 μm (14.1 μm), both exhibited very low anti-glare effect while resolution was not bad in both cases.

In Comparative Examples 5 and 6 which used acrylic resin particles as a matting agent instead of inorganic particles, when the content of the acrylic resin particles is the same as that in Comparative Example 5, resolution was poor whereas the anti-glare effect was satisfactory (not bad). When the content of the acrylic resin particles was reduced to such an extent that the resolution became satisfactory (Comparative Example 6), the anti-glare effect was reduced. Further, hardness of the transparent hard coat layers of both of Comparative Examples 5 and 6 were worse than that of Examples using inorganic particles as a matting agent.

On the other hand, the transparent hard coat films of Examples 1–3 exhibited an excellent anti-glare effect and resolution, and had sufficient hardness. These results showed that a transparent hard coat film having good hardness and well-balanced anti-can glare effect and resolution can be obtained by using the HbHC agent and inorganic particles of a particular mean particle diameter in combination for the transparent hard coat layer.

What is claimed is:

1. A transparent hard coat film comprising a transparent polymer film and a transparent hard coat layer formed on at least one surface of the transparent polymer film, wherein the transparent hard coat layer is composed of at least an ionizing radiation curable organic-inorganic hybrid hard-coat agent and inorganic particles having a mean particle diameter of 1–10 μm.

2. The transparent hard coat film according to claim 1, wherein the ionizing radiation curable organic-inorganic hybrid hard-coat agent includes reactive silica particles to which a photosensitive group having a photopolymerizable property is introduced at least on the surface, and the reactive silica particles have a mean particle diameter of 0.001–0.1 μm.

3. The transparent hard coat film according to claim 1, wherein the transparent hard coat layer has a thickness of 2–10 μm.

4. The transparent hard coat film according to claim 1, wherein the transparent hard coat layer contains the inorganic particles in an amount of not less than 2 parts by weight and not more than 20 parts by weight based on 100 parts by weight of the hard-coat agent.

* * * * *